US011449569B2

(12) United States Patent
Ivanov et al.

(10) Patent No.: US 11,449,569 B2
(45) Date of Patent: Sep. 20, 2022

(54) MULTI-ENTRY POINT NAVIGATION FOR USER INTERFACES

(71) Applicant: VMware, Inc., Palo Alto, CA (US)

(72) Inventors: Ivan Nikolov Ivanov, Sofia (BG);
Deyan Halachliyski, Sofia (BG);
Tihomir Plamenov Paskalev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 16/372,487

(22) Filed: Apr. 2, 2019

(65) Prior Publication Data

US 2020/0320148 A1 Oct. 8, 2020

(51) Int. Cl.
*G06F 16/954* (2019.01)
*G06F 16/31* (2019.01)
*G06F 16/28* (2019.01)
*G06F 16/951* (2019.01)

(52) U.S. Cl.
CPC .......... *G06F 16/954* (2019.01); *G06F 16/285* (2019.01); *G06F 16/951* (2019.01)

(58) Field of Classification Search
CPC ...... G06F 16/954; G06F 16/285; G06F 40/14; G06F 16/951; G06F 16/322
USPC ................. 715/234, 200, 763, 764
See application file for complete search history.

(56) References Cited

U.S. PATENT DOCUMENTS

| | | | | |
|---|---|---|---|---|
| 7,860,838 | B2 * | 12/2010 | Gupta | H04L 67/125 707/651 |
| 7,908,550 | B1 * | 3/2011 | Chittu | G06F 9/451 715/234 |
| 8,019,811 | B1 * | 9/2011 | Britto | H04L 29/06 709/203 |
| 8,307,119 | B2 * | 11/2012 | Rochelle | G06Q 10/10 709/248 |
| 8,818,974 | B2 * | 8/2014 | Comeau | G06F 16/2365 707/703 |
| 9,244,717 | B2 * | 1/2016 | Pissay | G06F 9/45558 |
| 9,652,273 | B2 * | 5/2017 | Davis | G06F 9/45545 |

(Continued)

OTHER PUBLICATIONS

Solarwinds, Evaluation Guide Virtualization Manager, published 2017, Solarwinds, pp. 1-15 (pdf).*

(Continued)

*Primary Examiner* — Manglesh M Patel
(74) *Attorney, Agent, or Firm* — Thomas | Horstemeyer LLP

(57) ABSTRACT

Disclosed are various approaches for implementing a navigation system that facilitates navigation through hierarchically-related views within a user interface using multiple independent entry points. The user interface can include multiple navigation components that each independently provide a user access to available views in the user interface. Upon a user selection for a view through interaction with one of the navigation components, a request for data used to build the view can be sent to a server. If the view is valid, an instance of the view is dynamically generated and displayed in the user interface and each navigation component is updated to be consistent with the selected view. If the view is invalid, updated navigation data is used to rebuild the navigation hierarchy and the navigation components are updated according to the updated navigation hierarchy.

20 Claims, 6 Drawing Sheets

(56) References Cited

U.S. PATENT DOCUMENTS

2007/0101255 A1\* 5/2007 Garg .................... G06T 11/206
  715/209
2008/0115049 A1\* 5/2008 Tolle ...................... G06F 40/18
  715/209

OTHER PUBLICATIONS

VMware, Understanding Server-Side Objects, Creation date Jun. 21, 2017 via Carbon Dating the Web, VMware, pp. 1-7 (pdf).\*
Zoomed Screenshots of SolarWinds pp. 5 & 11.\*

\* cited by examiner

11,449,569 B2

MULTI-ENTRY POINT NAVIGATION FOR USER INTERFACES

BACKGROUND

Today, large numbers of computing devices connect to each other over the Internet. As a result, those computing devices have access to various types of electronic documents and other files that can be viewed in a browser-based user interface. A user can interact with a web-based application through a browser-based user interface to access to information provided by the application. In some examples, a user interface can be designed to include different layers of views. These views can be can be hierarchically-related such that information included in a lower-layer view is related to information associated with a higher-level view.

For example, a web-application can correspond to an enterprise environment that includes multiple software defined datacenters distributed over various geographic locations. Datacenters include physical and virtual components that, when executed, provide web services, cloud computing environments, virtualization environments, as well as other computing systems. Data centers can also include virtual machines (VMs), which include emulations of a computer system. A user interface for the web-application can have hierarchically-related views that correspond to the structure of the enterprise environment based on the different datacenters and VMs.

While a user interface can facilitate navigation through the hierarchy of views, a visual summary of the hierarchy through which the user navigates may not be available as the user proceeds through the hierarchy. Further, the information corresponding to the views can be modified rendering a particular view invalid. For example, in an enterprise environment, a VM may be deleted by an administrator or a datacenter at a particular site may be subject to a power outage. When a view is no longer available, the structure of the user interface and underlying layers can become obsolete.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a user interface navigation system that facilitates navigation of hierarchically-related views within a user interface. Navigation is facilitated using multiple independent entry points. A user can interact with a user interface to access information available through hierarchically-related views of the user interface. In a situation where a user interface contains only one navigation component that provides an entry point for a user to navigate through a hierarchy, a visual summary of the hierarchy through which a user navigates may not be available. Therefore, another navigation component that also provides an entry point into the navigation hierarchy can improve usability of the user interface. However, to avoid inconsistency, each navigation component should be updated following navigation events associated with one navigation component.

Figure 1:
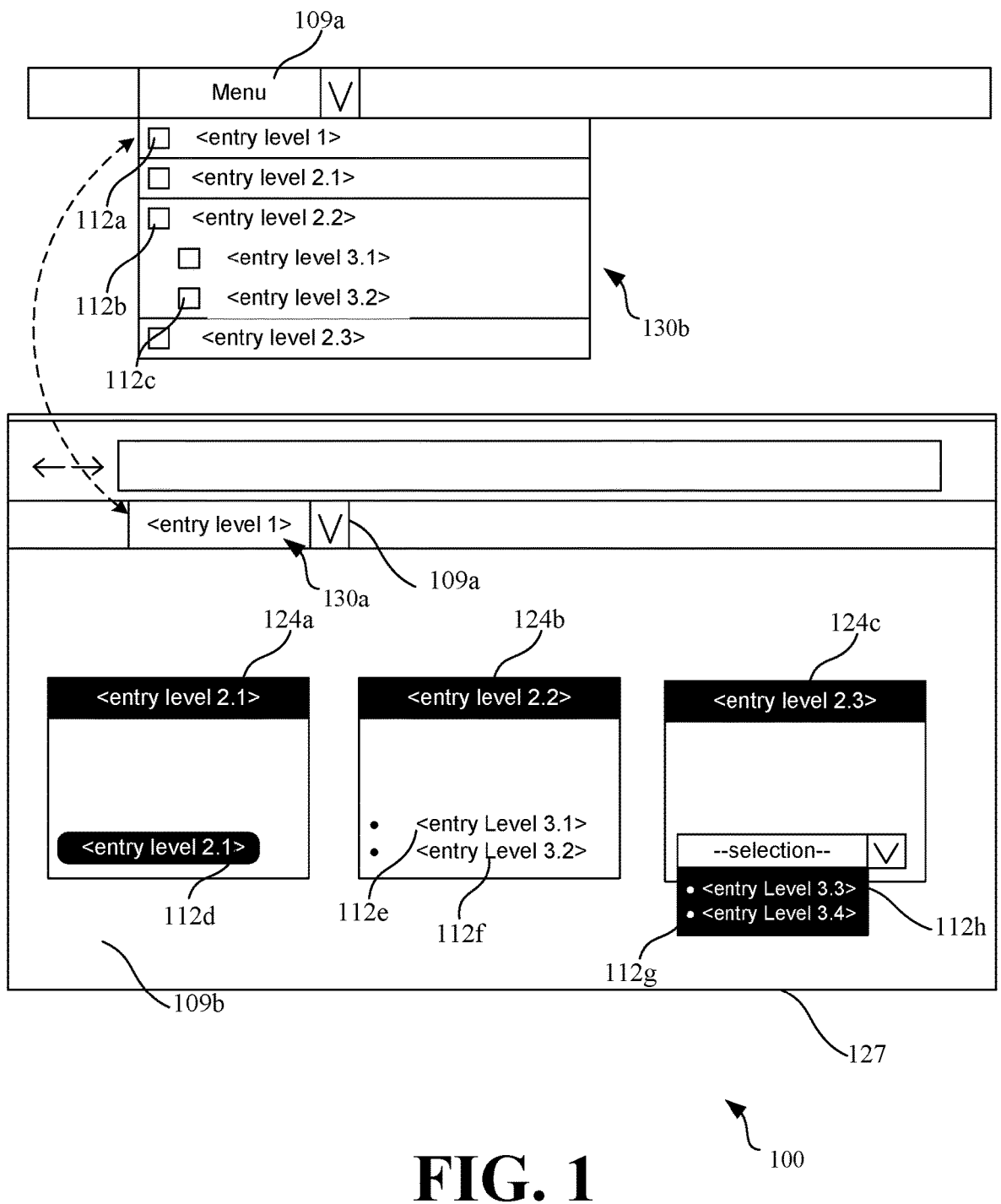
FIG. 1 is a drawing of an example user interface that provides multiple independent entry points for navigation through a hierarchy of views.
Figure 2:
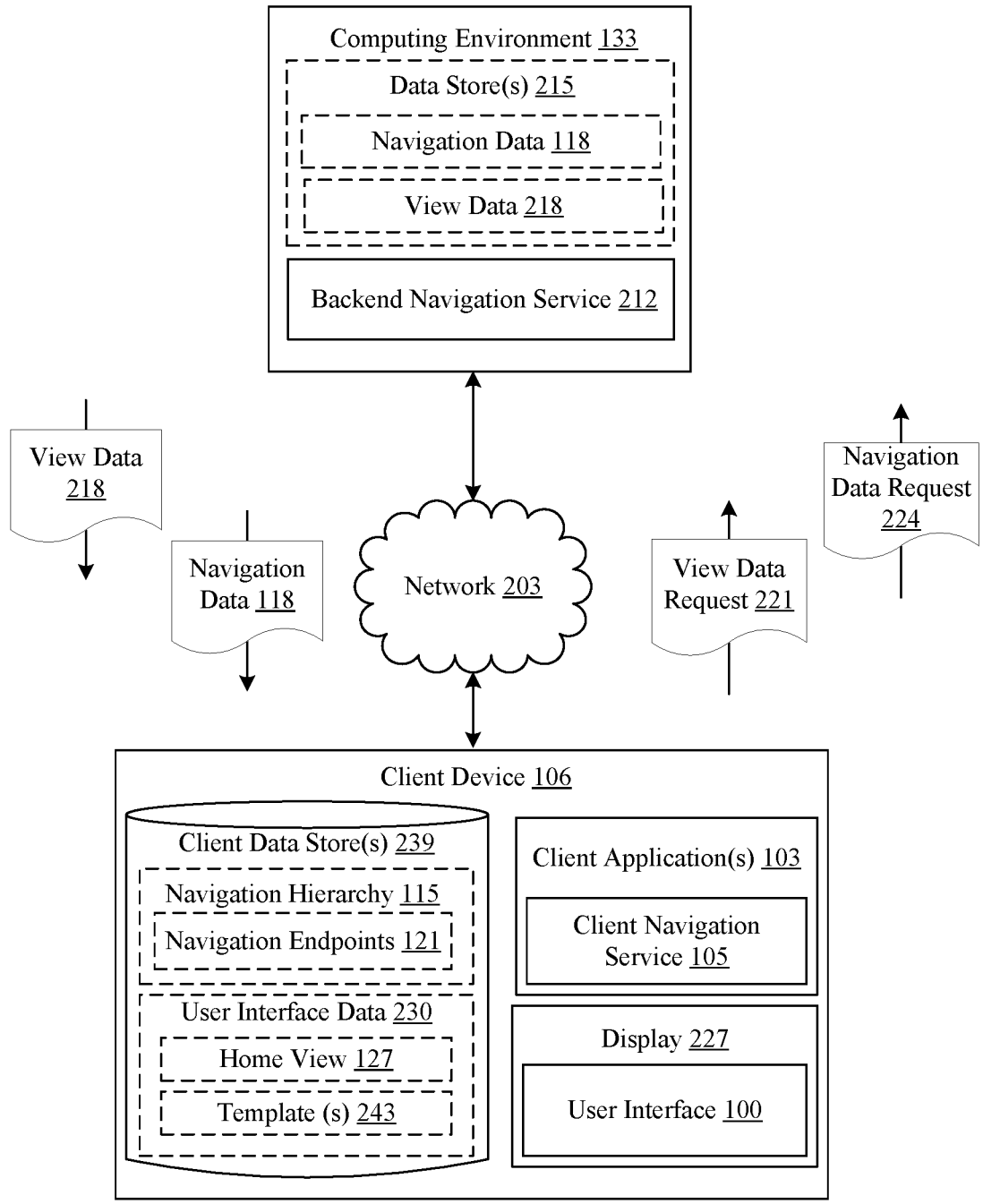
FIG. 2 is a drawing of an example of a network infrastructure including components connected through a network.

FIG. 1 illustrates an example. User interface 100 is generated by a client application 103 (FIG. 2) executed on a client device 106 (FIG. 2). The user interface 100 includes multiple navigation components 109 that represent a point of entry to a hierarchy of views available through the user interface 100. Each navigation component 109 graphically represents the available views within the hierarchy of views by using navigation entries 112 (e.g., 112a . . . 112h) that are displayed in a format corresponding to the hierarchy structure.

A navigation component 109 can build navigation entries 112 corresponding to the different views using a navigation hierarchy 115 (FIG. 2) as a data source. The navigation hierarchy 115 can be built from navigation data 118 (FIG. 2) obtained from a server or other backend functionality. The navigation entries 112 can be represented by buttons, links, dropdown boxes, or other selectable elements that can reference a path to each of the available navigation endpoints 121 (FIG. 2) or views. A user selection of a navigation entry 112 in a navigation component 109 can trigger a request for the view associated with the selected navigation entry 112. If the view remains valid, an instance of the view can be dynamically generated and displayed in the user interface 100. When a user selects a navigation entry 112 in one navigation component 109, all navigation components 109 can be updated to be consistent with the selected navigation entry 112 and corresponding view.

The navigation hierarchy 115 can be represented in the navigation components 109 in the form of list views, grid views, image views, or other type of graphical representations that can provide a user a view of the hierarchy structure. The navigation components 109 can differ in the type of format used to display the navigation hierarchy 115. For example, in FIG. 1, navigation component 109a displays the navigation entries 112 in a list view that is structured according to navigation hierarchy 115. In contrast, navigation component 109b of FIG. 1 displays the navigation hierarchy 115 using a grid view. In this format, each grid element 124 (e.g., 124a, 124b, 124c) graphically represents the next level of available views in the hierarchy 115. Each grid element 124 can further include navigation entries 112 associated with views that branch off from the higher-level navigation entries 112.

In FIG. 1, the current view is the home view 127 which corresponds to "entry level 1." In this example, the home view 127 is the root of the navigation hierarchy 115. In the navigation hierarchy 115, the home view 127 branches off into views associated with "entry level 2.1," "entry level 2.2" and "entry level 2.3." The grid elements 124 for the navigation component 109b graphically represent the next-level available views (e.g., "entry level 2.1," "entry level 2.2" and "entry level 2.3,") that branch off the home view 127 (e.g., "entry level 1.1"). Each grid element 124 includes navigation entries 112 corresponding to the different available views in accordance to the navigation hierarchy 115.

The navigation components 109 included in the user interface 100 can have two different states. A read-only or non-active state 130*a* displays a reference to the last active view. For example, the last activated view corresponds to the navigation entry 112 associated with the view. When the home view 127 is last selected or is the user interface 100 is forced to display the home view 127 due to a detected error, the navigation entry 112 displayed in the non-active state 130 corresponds to with the home view 127. In some examples, the read-only state 130*a* can include a detailed presentation related to the placement of the navigation entry 112 in the navigation hierarchy 115.

A modifying or active state 130*b* displays an entire hierarchical structure of available navigation entries 112 corresponding to the hierarchy of views. In this state, a navigation component 109 provides a visual distinction to the currently-selected navigation entry 112. FIG. 1 illustrates an example of the read-only state 130*a* and the modifying state 130*b* with respect to the navigation component 109*a*.

When a user selects a navigation entry 112 that is different from the previously-selected navigation entry 112, the navigation component 109 can initiate a corresponding navigation action. For example, the navigation component 109 can initiate an action to generate and display an instance of the view associated with the selected navigation entry 112. When the navigation action is completed, the navigation component 109 can transition to a read-only state 130*a* and display a reference to the currently-represented navigation entry 112. In the example of FIG. 1, if a user selects "entry level 2.1," the read-only state 130*a* of the navigation component 109*a* would be updated to replace "entry level 1" with "entry level 2.1."

As navigation data 118 can be changed in a computing environment 133 (FIG. 2), a selected navigation entry 112 can become invalid. For example, a view can be invalid if data associated with the view or other aspect of the branch is deleted by an administrator or inaccessible due to an unexpected event (e.g., power outage, natural disaster). When the view is determined to be invalid, the user interface 100 can return to the static home view 127, and the navigation hierarchy 115 can be rebuilt according to updated navigation data 118 that does not include a reference to the invalid view or branch. In addition, any time that a user selects the navigation entry 112 corresponding to the home view 127, the navigation hierarchy 115 can be refreshed using updated navigation data 118 received from the computing environment 133. The user interface 100 and corresponding navigation components 109 can be updated in real time to be consistent with the current navigation hierarchy and views.

Moving on to FIG. 2, shown is an example of a networked environment 200. The networked environment 200 includes a computing environment 133 and a client device 106, which are in data communication with each other across a network 203. The network 203 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 203 can also include a combination of two or more networks 203. Examples of networks 203 can include the Internet, intranets, extranets, virtual private networks (VPNs), and similar networks.

The computing environment 133 can include a server computer or any other system providing computing capability. Alternatively, the computing environment 133 can employ a plurality of computing devices that can be arranged in one or more server banks, computer banks or other arrangements. The computing devices of the computing environment 133 can be located in a single installation or can be distributed among many different geographical locations local or remote from the other components. The computing environment 133 can include a grid computing resource or any other distributed computing arrangement. The computing environment 133 can also include or be operated as one or more virtualized computer instances. For purposes of convenience, the computing environment 133 is referred to herein in the singular.

The components executed on the computing environment 133 can include a backend navigation service 212 as well as other applications, services, processes, systems, engines, or functionality not discussed in detail herein. The backend navigation service 212 can be stored in the data store 215 of the computing environment 133. The backend navigation service 212 can interact with the client application 103 executed by the client device 106 to provide data requested by the client application 103. In some examples, the backend navigation service 212 can interact with the client application 103 through a client navigation service 105 executed by the client application 103. The client navigation service 105 can include client-side executable code provided by the backend navigation service 212 or other suitable software component of the computing environment 133. For example, the client navigation service 105 can comprise a package of executable code containing hypertext markup language (HTML), cascading style sheets (CSS), JavaScript (JS) or any other language suitable for creating content. When executed by the client application 103, the client navigation service 105 can be used to generate the user interface 100 that allows a user to navigate through a hierarchy of views through multiple points of entry.

The backend navigation service 212 can provide view data 218 associated with a view. The view data 218 can be used by the client navigation service 105 to build the instance of the view displayed by the user interface 100. The backend navigation service 212 can provide the view data 218 in response to a view data request 221 sent by the client navigation service 105. The view data request 221 can contain a current navigation endpoint or view associated with a selected navigation entry 112.

The backend navigation service 212 can also determine if the view or hierarchy branch associated with the view is still valid by determining if the current navigation endpoint 121 or view is still included in the navigation data 118. If the navigation data 118 has changed and the navigation endpoint 121 or view is no longer available, the backend navigation service 212 can notify the client application 103 or client navigation service 105 that the view is invalid.

The backend navigation service 212 can further interact with the client application 103 to provide updated navigation data 118 which can be used to rebuild a navigation hierarchy 115. The client application 103 or client navigation service 105 can send a navigation data request 224 requesting updated navigation data 118 to the backend navigation service 212. Upon receipt of the request 224, the backend navigation service 212 can send the updated navigation data 118 to the client application 103 or client navigation service 105.

Also, various data is stored in a data store 215 that is accessible to the computing environment 133. The data store 215 can be representative of a plurality of data stores, which can include relational databases, object-oriented databases, hierarchical databases, hash tables or similar key-value data stores, as well as other data storage applications or data structures. The data stored in the data store 215 is associated with the operation of the backend navigation service 212, as well as potentially other applications or functional entities described later. This data can include navigation data 118, view data 218, and potentially other data.

The navigation data 118 includes data that can define the available views and relationships between the available views. The navigation data 118 can be used to build a navigation hierarchy 115 that defines to the structure or topology associated with the views of the user interface 100 generated by the client application 103 or the client navigation service 105 executed by the client application 103. For example, in an enterprise environment that comprises various software-defined datacenters distributed over multiple sites and geographic locations, the navigation data 121 can correspond to the data and structure or topology of the software-defined datacenters and associated workloads.

The view data 218 represents data that is used to generate an instance of a view requested by a user interacting with user interface 100 generated by the client navigation service 105. The view data 218 can include data that can be used to generate content that visually represents information associated with requested view. For example, the view data 218 can include files for generating content in hypertext markup language (HTML), cascading style sheets (CSS), JavaScript (JS) or any other language suitable for creating content. The view data 218 can also include content data that can be fed into a view template to generate the instance of the view. For example, in the case of software-defined datacenter of an enterprise environment, the view data 218 can include data that can be used to visually represent information associated with a particular workload or workload pairing that correspond to a selected view. The view data 218 can be sent to the client application 103 executed by the client device 106. The client navigation service 105 executed by the client application 103 can use the view data 218 to dynamically generate an instance of the view.

The client device 106 is representative of a plurality of client devices 106 that can be coupled to the network 203. The client device 106 can include a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 227, such as liquid crystal displays (LCDs), gas plasma-based flat panel displays, organic light emitting diode (OLED) displays, electrophoretic ink ("E-ink") displays, projectors, or other types of display devices. In some instances, the display 227 can be a component of the client device 106 or can be connected to the client device 106 through a wired or wireless connection.

The client device 106 can execute various applications such as a client application 103. The client application 103 can render a user interface 100 on the display 227. The client application 103 can represent various types of applications executable by the client device 106. For example, the client application 103 could be a web browser and the user interface 100 could include content rendered within a browser window. In some examples, the client application 103 can execute a client navigation service 105 to generate the user interface 100 and facilitate navigation through a hierarchy of views within the user interface 100. The client navigation service 105 can comprise client-side executable code provided in conjunction with a browser-based interface served by the backend navigation service 212 or other suitable software component in the computing environment 133.

In some examples, the client navigation service 105 can generate the views of the user interface 100 to be displayed within the browser window according to the user interface data 230 and the view data 218 received from the backend navigation service 212. The client navigation service 105 can be based on a front-end web application framework such as ANGULAR or other type of front-end web application framework. The client navigation service 105 can include HTML, CSS, JavaScript, or any other language suitable for creating content to be displayed in a browser window. The client device 106 can execute applications beyond the client application 103 such as email applications, instant message applications, or other applications.

The client data store 239 can include memory of the client devices 106 or other storage resources on which data can be stored by the client device 106. In some examples the data store 239 includes the navigation hierarchy 115, user interface data 230, and other data. The navigation hierarchy 115 corresponds to the structure or topology of the hierarchy of views associated with the user interface 100. The navigation hierarchy 115 includes the navigation endpoints 121 and the relationship between the navigation endpoints 121 in the navigation hierarchy 115. A navigation endpoint 121 can corresponds to a view that is displayable within the user interface 100.

The user interface data 230 can include images, text, code, graphics, audio, video, and other content that can be used by the client application 103, client navigation service 105, or other suitable software component in the client device 106. To this end, user interface data 230 can include static content or static elements of content in HTML, extensible markup language (XML), CSS, JavaScript, or any other language suitable for creating content. User interface data 230 can also include code configured to be executed or interpreted within a client device 106 in order to render dynamic content or user interface elements. In some examples, the user interface data 230 can include client side execution code corresponding to the client navigation service 105 and provided by the computing environment 133. The user interface data 230 can also include code for generating the different navigation components 109 of the user interface 100. Each component 109 can be build its navigation entries 112 corresponding to the navigation endpoints 121 using the navigation hierarchy 115 as a data source. The code can be referred to as applets and can be written in any suitable programming language, such as TypeScript, JavaScript, Java, etc.

The user interface data 230 can include static content that corresponds to the home view 127. The user interface data 230 can also include templates 243 that can be used to dynamically generate instances of views for display. For example, in response to receiving view data 218 from the backend navigation service 212, the client navigation service 105 can dynamically generate the instance of the view based on a template 243 and the received view data 218.

Next, a general description of the operation of the various components of the networked environment 200 is provided. To begin, a user interacting with the client application 103 can request access to content associated with the navigation system. In response, the backend navigation service 212 can send client-side executable code to the client device 106. The client-side executable code corresponds to the client navigation service 105 and can be executed by the client application 103. The client navigation service 105 executed by the client application 103 generates a user interface 100 that includes multiple navigation components 109 and the client application 103 renders the user interface 100 on the display 227 of the client device 106. The home view 127 of the user interface 100 corresponds to the root of the navigation hierarchy 115 and is the view that is initially displayed. The client navigation service 105 can send a navigation data request 224 using an API call or other suitable communication across a network 203 to the backend navigation service 212 in the computing environment 133 to request the current navigation data 118. In response to receiving the navigation data 118 from the backend navigation service 212, the client navigation service 105 can build the navigation hierarchy 115 using the navigation data 118. Each navigation component 109 can use the navigation hierarchy 115 to generate the respective navigation entries 112 for navigating through the hierarchy of views.

Each navigation component 109 can provide a point of entry into the hierarchy of views. A user interacting with the user interface 100 can select a navigation entry 112 through interaction with one of the navigation components 109. With reference to the example user interface 100 of FIG. 1, a user can interact with the list view of navigation entries 112 in the navigation component 109a or the grid view of navigation entries 112 displayed in the navigation component 109b. By interacting with any navigation component 109 of the user interface 100, the user can select a navigation entry 112 that corresponds to a navigation endpoint 121 or view that the user would like to be displayed on the user interface 100.

In some examples, another point of entry into the hierarchy of views can be triggered from interactions outside of the client application 103. For example, a point of entry can include a uniform resource locator (URL) that a user can enter into a browser window. The URL can corresponds to a selection of navigation entry 112. Assuming the view associated with the URL is valid, the client application 103 can generate a user interface 100 displaying the view associated with the URL. In addition, the navigation components 109 can be updated to be consistent with the displayed view and level within the hierarchy 115.

In response to identifying the selection of a navigation entry 112, the client navigation service 105 can generate and send a view data request 221 to the backend navigation service 212. The view data request 221 includes an identification of the navigation endpoint 121 or view that a user has requested to be displayed. In addition, the view data request 221 can include a location within the hierarchy that is associated with the selected view. The client navigation service 105 can send the request 221 to the backend navigation service 212 in the form of an application programming interface (API) call.

The backend navigation service 212 can analyze the navigation data 118 to determine whether the navigation endpoint 121 is still included in the navigation data 118. If the navigation endpoint 121 is still included in the navigation data 118, the backend navigation service 212 can send the view data 218 associated with the requested view to the client application 103 or client navigation service 105. In some examples, the backend navigation service 212 can dynamically generate the view to be displayed on the user interface 100 and transmit the view to the client device 106. In other examples, the client navigation service 105 executed by the client application 103 can dynamically generate the instance of the view and display the instance of the view on the user interface 100 based on the view data 218 received from the backend navigation service 212. The navigation components 109 can be updated to reflect the available set of views in the navigation hierarchy 115 based on the selected navigation entry 112 such that each navigation component 109 is consistent with the current view that is displayed.

In some examples, each navigation component 109 can listen for navigation events associated with other navigation components 109. Upon identifying an occurrence of a navigation event associated with another navigation component 109, each navigation component 109 can be updated to be consistent with the set of available views in the hierarchy in response to the navigation event. An occurrence in a navigation event in one navigation component 109 can be translated into a service call that informs the other navigation components 109 of the navigation event to allow each component 109 to update accordingly.

If the backend navigation service 212 determines that the requested view is no longer valid, the backend navigation service 212 can send a response to the client navigation service 105 executed by the client application 103 to notify the client navigation service 105 that the view is no longer valid. When there is a detected change in the navigation data 118 that results in a requested view or branch being invalid, the client navigation service 105 causes the user interface 100 to display the home view 127. In addition, the client navigation service 105 executed by the client application 103 sends a navigation data request 224 to the backend navigation service 212 in the computing environment 133 to request the updated navigation data 118.

The backend navigation service 212 sends the updated navigation data 118 to the client application 103 or client navigation service 105. The client navigation service 105 then rebuilds the navigation hierarchy 115 using the received navigation data 118. In particular, the client navigation service 105 analyzes the data in the updated navigation data 118 received from the computing environment 133 to determine the updated structure or topology of the views. The navigation components 109 can be updated such that the navigation entries 112 for each of the navigation components 109 can correspond to the updated navigation hierarchy 115.

It should be noted that each time the user interface returns to the home view 127, the navigation hierarchy 115 can be refreshed. The user interface 100 can return to the home view 127 by user selection or in response to a selected view being invalid. Each time the user interface returns to the home view 127, the client navigation service 105 sends a request for updated navigation data 118 to the backend navigation service 212, and rebuilds the navigation hierarchy 115 as discussed above.

Figure 3:
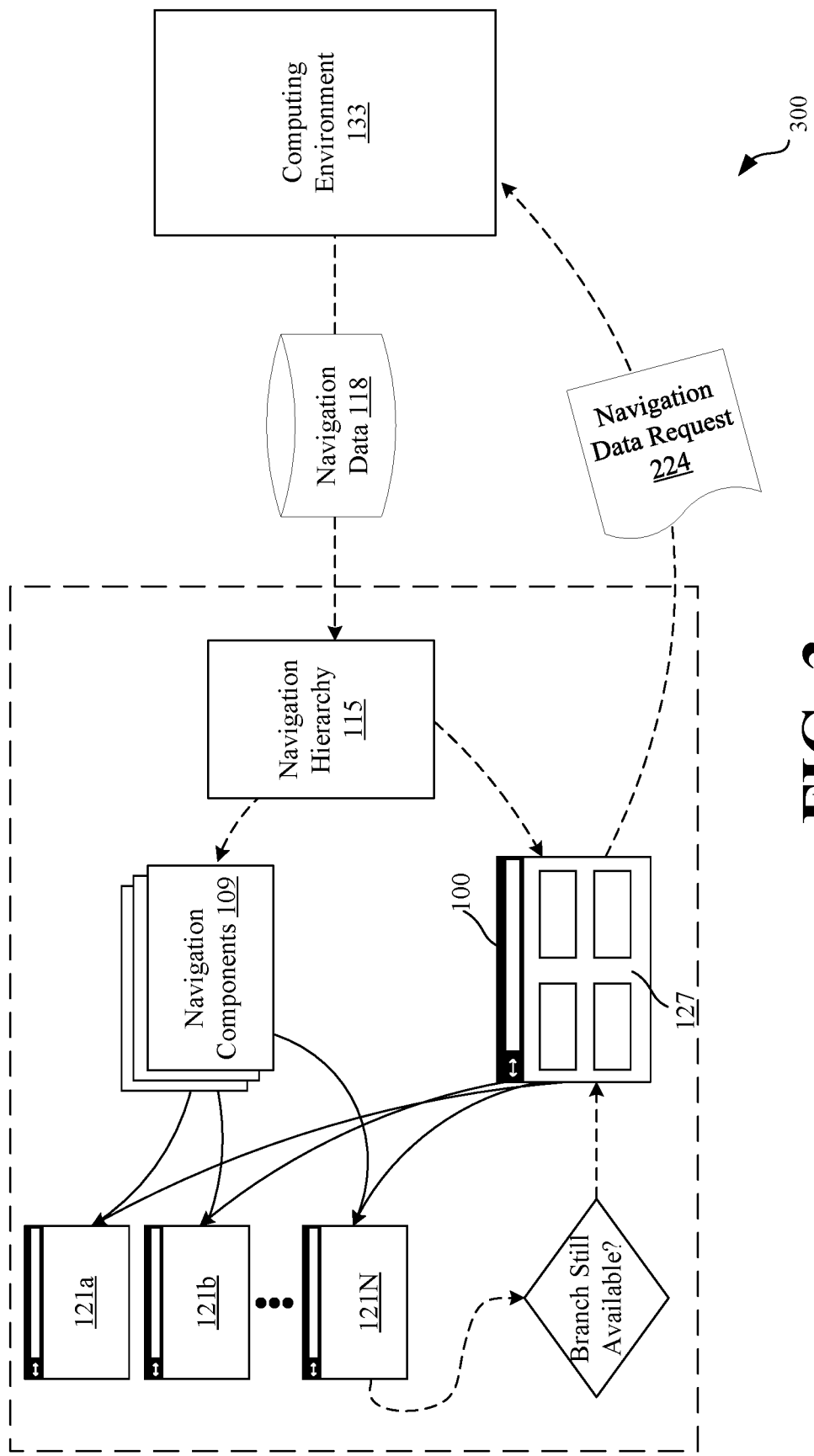
FIG. 3 is an example of a drawing that visually illustrates actions by a user and the navigation system of FIG. 2 with respect to navigating through the hierarchy of views.

FIG. 3 illustrates an example drawing that visually illustrates the actions by the user and the navigation system with respect to navigating through the hierarchy of views. The solid lines represent actions that are performed by the user and the dotted lines represent actions of the navigation system, which is collectively the client application 103, the client navigation service 105, and the backend navigation service 212. In particular, the home view 127 of the user interface 100 can be rendered and the user can interact with the different navigation components 109 to view different navigation endpoints 121 (e.g., 121*a*, 121*b*, . . . 121N). As long as the requested views are valid, the client navigation service 105 dynamically generates the instances of the views using the view data 218 received from the computing environment 133.

If a branch in the hierarchy is no longer valid, the home view 127 of the user interface 100 can be displayed and the client navigation service 105 can send the navigation data request 224 to the computing environment 133 which in turn provides the navigation data 118 to the client application 103 or client navigation service 105 executed by the client application 103. The current navigation data 118 can be used as a data source to rebuild the navigation hierarchy 115 stored on the client device 106 and the navigation components 109 are all updated to reflect the updated navigation hierarchy 115. Once the user interface and navigation components 109 are updated to reflect the updated navigation hierarchy 115, the user can proceed to navigation through with the user interface 100 through interactions with any one of the navigation components 109.

Figure 4A:
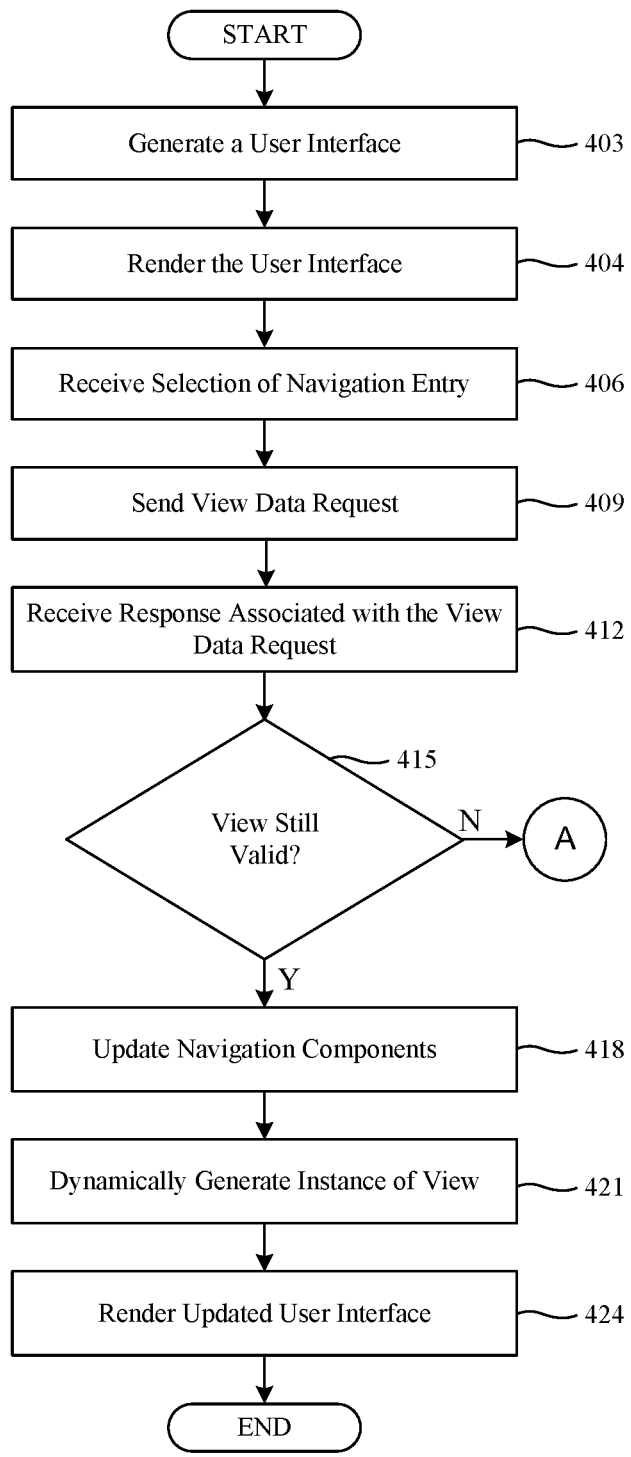
FIGS. 4A, 4B, and 5 are flowcharts that illustrate functionality implemented by components of the networked environment of FIG. 2.

Moving on to FIG. 4A, shown is a flowchart 400*a* that provides one example of the operation of a portion of the network environment 200. The flowchart of FIG. 4A can be viewed as depicting an example of elements of a method implemented by the client application 103, client navigation service 105, or other components executing in the client device 106. The separation or segmentation of functionality as discussed herein is presented for illustrative purposes only.

Beginning with step 403, the client application 103 generates a user interface 100. The user interface 100 is generated to include multiple navigation components 109 that each represent an entry point for accessing the hierarchically-related views. The root of the navigation hierarchy 115 includes a home view 127. The home view 127 is a static view and is the only view within the navigation hierarchy 115 that is not dynamically generated. The client navigation service 105 can generate the user interface 100 by executing client-side executable code provided up by the backend navigation service 212.

At step 404, the client application 103 renders the user interface 100 on a display 227 of the client device 106.

At step 406, the client application 103 receives a user selection of a navigation entry 112. The navigation entry 112 corresponds to a view in a subset of views that are available in the navigation hierarchy 115 according the home view or a previously-selected view. A user can select a navigation entry 112 that corresponds to a desired view by interacting with any of the navigation components 109 since each navigation component 109 provides its own presentation of the available views in the navigation hierarchy 115.

At step 409, the client navigation service 105 executed by the client application 103 sends a view data request 221 to the backend navigation service 212 in the computing environment 133. The view data request 221 can include a navigation endpoint 121 that is associated with the selected navigation entry 112. The client navigation service 105 can use view data 218 from the computing environment 133 to dynamically generate the instance of the view associated with the requested navigation endpoint 121.

At step 412, the client navigation service 105 receives a response associated with the view data request 221 from the backend navigation service 212. The response can include the view data 218 or a notification the corresponding navigation endpoint 121 is invalid.

At step 415, the client navigation service 105 determines if the view is still valid. The client navigation service 105 can determine if the view is still valid based on the response received from the backend navigation service 212. If the view is invalid, the client application 103 proceeds to step A which is discussed in further detail with reference to FIG. 4B. If the client navigation service 105 determines that the view is still valid, the process proceeds to step 418.

At step 418, all navigation components 109 are updated to be consistent and up-to-date with the selected navigation entry 112 and corresponding view. When a user selects the navigation entry 112 by interacting with one navigation component 109, the other navigation components 109 are updated to reflect the current view and navigation entry selection. The selection of navigation entry 112 can change the subset of available views in the navigation hierarchy 115 based on the location of the navigation entry 112 within the navigation hierarchy 115. Each navigation component 109 can build the navigation entries 112 associated with the views available based on the selected navigation entry 112.

At step 421, the client navigation service 105 dynamically generates an instance of the view associated with the selected navigation entry 112. The instance of the view can be dynamically generated based on the view data 218 received from the backend navigation service 212. In some example, the client navigation service 105 uses a view template and the view data 218 to dynamically generate the instance of the view.

At step 424, the client navigation service 105 renders and updated user interface 100. The updated user interface 100 includes a display of the dynamically generated view instance. In addition, each navigation components 109 visually represents the navigation hierarchy 115 with respect to the current view. Upon rendering of the updated user interface, the process proceeds towards completion.

Figure 4B:
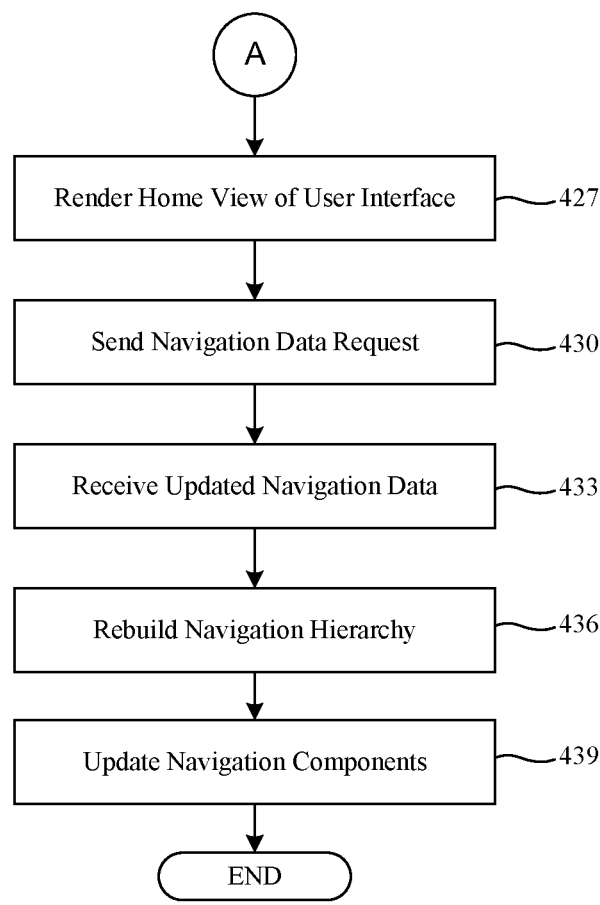

Moving on to FIG. 4B, shown is a flowchart 400*b* that provides one example of the operation of a portion of the network environment 200. The flowchart of FIG. 4B can be viewed as depicting an example of elements of a method implemented by the client application 103, the client navigation service 105, or other components executing in the client device 106. The separation or segmentation of functionality as discussed herein is presented for illustrative purposes only.

Beginning with step 427, after the client navigation service 105 determines that a requested view is invalid, the client application 103 renders a home view 127 of the user interface 100. The home view 127 of the user interface 100 corresponds to the root of the navigation hierarchy 115 and is a static view. In some examples, the client application 103 or client navigation service 105 generates an error notification that can be rendered alongside the home view 127. The error notification can provide notice to the user that there was an error associated with the most recent view request. The error notification can be included in a popup box or other type of user interface element.

At step 430, the client application 103 or client navigation service 105 sends a navigation data request 224 to the backend navigation service 212. The navigation data request 224 requests that the backend navigation service 212 send the navigation data 118 to the client application 103 or client navigation service 105.

At step 433, the client application 103 or client navigation service 105 receives the updated navigation data 118 from the backend navigation service 212.

At step 436, the client navigation service 105 executed by the client application 103 rebuilds the navigation hierarchy 115 according to the updated navigation data 118. For example, the client navigation service 105 can analyze the navigation data 118 to identify the structure and topography of the views. For example, the navigation data 118 can describe the relationships between the different navigation endpoints 121 which can be used to generate the navigation hierarchy 115.

At step 439, the navigation components 109 of the user interface 100 are updated based on the rebuilt navigation hierarchy 115. In particular, each navigation component 109 rebuilds the navigation entries 112 that provide access to the different navigation endpoints 121 or views in the user interface 100. Once updated, each navigation component 109 is consistent with the rebuilt navigation hierarchy 115. Accordingly, a user can begin to navigate through hierarchy of views of the user interface 100 according to the rebuilt navigation hierarchy 115 instead of an out-of-date navigation hierarchy 115 that contained views that were no longer available. Upon updating the navigation components 109, the process proceeds to completion.

Figure 5:
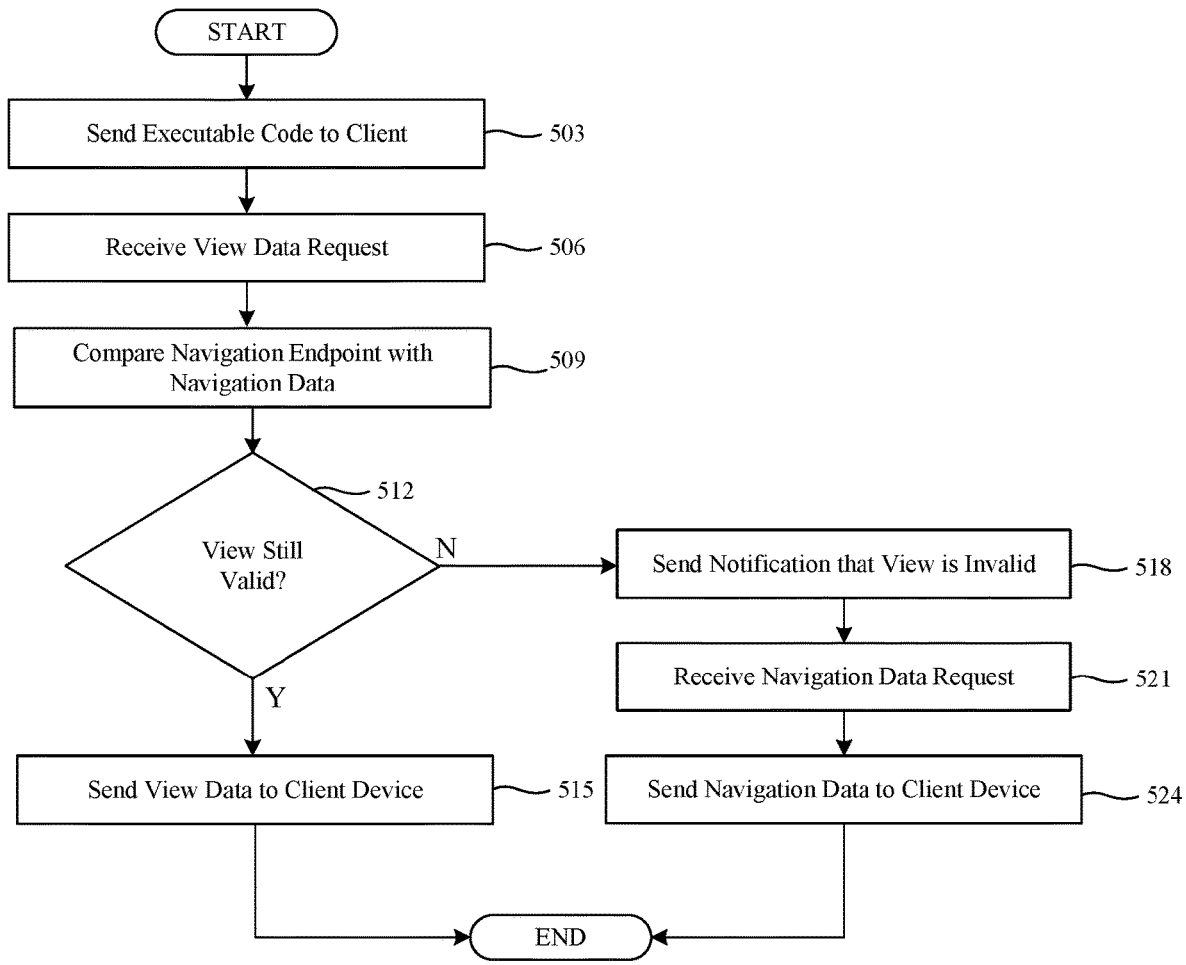

Turning now to FIG. 5, shown is a flowchart 500 that provides one example of the operation of a portion of the network environment 200. The flowchart of FIG. 5 can be viewed as depicting an example of elements of a method implemented by the backend navigation service 212 or other components executing in the computing environment 133. The separation or segmentation of functionality as discussed herein is presented for illustrative purposes only.

Beginning with step 503, the backend navigation service 212 sends client-side executable code to the client device 106. The client-side executable code corresponds to the client navigation service 105 and can be executed by the client application 103. The client application 103 can correspond to a browser and the backend navigation service 212 can send the client-side executable code in response to a request to interact with the navigation system associated with the computing environment 133. The client-side executable code can generate a user interface 100 with multiple components 109 that each provide a point of entry to navigation through a hierarchy of views of the user interface 100.

At step 506, the backend navigation service 212 receives a view data request 221 from the client application 103 or client navigation service 105 executed by the client application. The view data request 221 corresponds to a request for view data 218 that can be used by the client navigation service 105 to generate an instance of a requested view. The view data request 221 can include the navigation endpoint 121 that identifies the view and an identification of a branch of the hierarchy associated with the view.

At step 509, the backend navigation service 212 compares the navigation endpoint 121 included in the view data request 221 to the navigation data 118 stored in the data store 215. The navigation data 118 stored in the data store 215 can be modified by external interactions such as administrator interactions, power outage, natural disaster, or other interactions. For example, in an enterprise environment that comprises various software-defined datacenters distributed over multiple sites and geographic locations, the navigation data 121 can correspond to the data and structure or topology of the software-defined datacenters and associated workloads. In this example, an administrator can modify or redefine the structure or topology of the datacenters and associated workloads which can result in a change in the navigation data 118. Additionally, there can be a power outage in a datacenter site which can result in the datacenter data or corresponding workload data to be non-existent. Accordingly, the backend navigation service 212 compares the navigation endpoint 121 with the navigation data 118 to determine if the view is still available and valid. If the underlying data corresponding to the view is no longer available in the navigation data 118, the view will be considered invalid.

At step 512, the backend navigation service 212 determines if the view is still valid. If the navigation endpoint 121 is still included in the navigation data 118, the view is considered valid and the process proceeds to step 515. If the navigation endpoint 121 is no longer included in the navigation data 118 or there is a change in the branch associated with the navigation endpoint 121, the view is considered invalid and the process proceeds to step 518.

At step 515, the backend navigation service 212 obtains view data 218 from the data store 215 and transmits it to the client application 103 or client navigation service 105 executed by the client application 103. Thereafter, the process proceeds to competition At step 518, the backend navigation service 212 sends a notification to the client application 103 or client navigation service 105 executed by the client application 103 that the view is invalid. The notification can be sent in the form of an API call or other suitable means of communication.

At step 521, the backend navigation service 212 receives a navigation data request 224 from the client application 103 or client navigation service 105. The navigation data request 224 includes a request for the navigation data 118 that is stored in the data store 215. Since the navigation data 118 stored in the data store 215 can be modified by interactions (e.g., administrator modifications, power outages) that are independent from those of the navigation system, the navigation data 118 stored in the data store 215 can differ overtime from the navigation data 118 used to generate the navigation hierarchy 115 stored in the client data store 239. The navigation data request 224 can come from the client application 103 or client navigation service 105 in response to determining that the navigation hierarchy 115 generated by the client navigation service 105 is out-of-date or otherwise stale.

At step 524, the backend navigation service 212 sends the navigation data 118 stored in the data store 215 to the client application or client navigation service 105. The navigation data 118 sent by the backend navigation service 212 represent the most up-to-date navigation data 118 and can be used by the client navigation service 105 to rebuild the navigation hierarchy 115 so that the navigation hierarchy 115 used to generate the user interface 100 is no longer obsolete.

Stored in the memory device are both data and several components that are executable by the processor. Also stored in the memory can be a data store and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the computing environment 133. These client devices can include a display upon which a user interface generated by a client application for providing a virtual desktop session (or other session) can be rendered. In some examples, the user interface can be generated using user interface data provided by the computing environment 133. The client device can also include one or more input/output devices that can include, for example, a capacitive touchscreen or other type of touch input device, fingerprint reader, or keyboard.

Although the client application 103, the client navigation service 105, the backend navigation service 212, and other systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for navigating through a hierarchy of views of a user interface, comprising:
   at least one computing device that comprises a processor and memory;
   at least one application executable by the at least one computing device, wherein, when executed, the at least one application causes the at least one computing device to at least:
      send executable code to a client, the executable code being configured to:
         generate the hierarchy of views for the user interface based on navigation data;
         generate the user interface comprising navigation components providing an entry point for navigation of the hierarchy of views;
         receive a selection of a view within the hierarchy, the selection received from a user interaction with one of the navigation components;
         send a request to the at least one computing device for data associated with the view; and
         update the user interface and the navigation components based on a response received from the at least one computing device;
      receive the request from the client for the data associated with the view, wherein the request comprises a navigation endpoint for a requested view and an identification of a branch in the hierarchy of views;

determine data that corresponds to the navigation endpoint for the requested view or the branch in the hierarchy of views is inaccessible from the navigation data;

determine that the requested view is an invalid view based at least in part on the data that corresponds to the navigation endpoint for the requested view or the branch in the hierarchy of views being inaccessible from the navigation data;

receive a navigation data request from the client for updated navigation data for rebuilding the hierarchy of views in an instance which the requested view is indicated as invalid to the client; and send the updated navigation data to the client for rebuilding the hierarchy of views stored in the client, the updated navigation data being sent in an instance in which the navigation data request for the updated navigation data has been received from the client, the updated navigation data comprising an updated structure of the hierarchy of views.

2. The system of claim 1, wherein the executable code is further configured to at least determine that the view is invalid.

3. The system of claim 2, wherein the executable code is further configured to:
generate an updated hierarchy of views based on the updated navigation data; and
update the user interface and the navigation components based on the updated hierarchy of views.

4. The system of claim 2, wherein the response indicates that the view is invalid, and the executable code being further configured to update the user interface to display a home view of the hierarchy of views in an instance in which the view is invalid, wherein the home view is static.

5. The system of claim 1, wherein:
the navigation components comprise an active state and a non-active state;
during the active state, the navigation components display an entire hierarchal structure of available navigation entries corresponding to the hierarchy of views; and
during the non-active state, the navigation components display a reference to a last activated view.

6. A non-transitory computer-readable medium embodying executable instructions, which, when executed by a processor, cause at least one computing device to at least:
send executable code to a client, the executable code being configured to:
generate a hierarchy of views for a user interface based on navigation data;
generate the user interface comprising navigation components providing an entry point for navigation of the hierarchy of views;
receive a selection of a view within the hierarchy, the selection received from a user interaction with one of the navigation components;
send a request to the at least one computing device for data associated with the view;
update the user interface and the navigation components based on a response received from the at least one computing device;
receive the request from the client for the data associated with the view, wherein the request comprises a navigation endpoint for a requested view and an identification of a branch in the hierarchy of views;

determine data that corresponds to the navigation endpoint for the requested view or the branch in the hierarchy of views is inaccessible from the navigation data;

determine that the requested view is an invalid view based at least in part on the data that corresponds to the navigation endpoint for the requested view or the branch in the hierarchy of views being inaccessible from the navigation data;

receive a navigation data request from the client for updated navigation data for rebuilding the hierarchy of views in an instance in which the requested view is indicated as invalid to the client; and send the updated navigation data to the client for rebuilding the hierarchy of views stored in the client, the updated navigation data being sent in an instance in which the navigation data request for the updated navigation data has been received from the client, the updated navigation data comprising an update structure of the hierarchy of views.

7. The non-transitory computer-readable medium of claim 6, wherein the executable code is further configured to at least determine that the view is invalid.

8. The non-transitory computer-readable medium of claim 7, wherein the executable code is further configured to:
generate an updated hierarchy of views based on the updated navigation data; and
update the user interface and the navigation components based on the updated hierarchy of views.

9. The non-transitory computer-readable medium of claim 7, wherein the response indicates that the view is invalid, and the executable code being further configured to update the user interface to display a home view of the hierarchy of views in an instance in which the view is invalid, wherein the home view is static.

10. The non-transitory computer-readable medium of claim 6, wherein the navigation components display the hierarchy of views in different formats from one another.

11. The non-transitory computer-readable medium of claim 6, wherein the response includes the data associated with the view, and the executable code further is configured to dynamically generate an instance of the view based on the data, and wherein updating the user interface comprises displaying the instance of the view.

12. A computer-implemented method for navigating through a hierarchy of views of a user interface, comprising:
sending, by at least one computing device, executable code to a client, the executable code being configured to:
generate the hierarchy of views for the user interface based on navigation data;
generate the user interface comprising navigation components providing an entry point for navigation of the hierarchy of views;
receive a selection of a view within the hierarchy, the selection received from a user interaction with one of the navigation components;
send a request to the at least one computing device for data associated with the view; and
update the user interface and the navigation components based on a response received from the at least one computing device;
receiving, by the at least one computing device, the request from the client for the data associated with the view, wherein the request comprises a navigation_endpoint for a requested view and an identification of a branch in the hierarchy of views;

determining, by at least one computing device, data that corresponds to the navigation endpoint for the requested view or the branch in the hierarchy of views is inaccessible from the navigation data;

determining, by at least one computing device, that the requested view is an invalid view based at least in part on the data that corresponds to the navigation endpoint for the requested view or the branch in the hierarchy of views being inaccessible from the navigation data;

receiving, by at least one computing device, a navigation data request from the client for updated navigation data for rebuilding the hierarchy of views in an instance in which the requested view is indicated as invalid to the client; and sending, by the at least one computing device, the updated navigation data to the client for rebuilding the hierarchy of views stored in the client, the updated navigation data being sent in an instance in which the navigation data request for the updated navigation data has been received from the client, the updated navigation data comprising an updated structure of the hierarchy of views.

13. The computer-implemented method of claim 12, wherein the executable code is further configured to determining that the view is invalid.

14. The computer-implemented method of claim 13, further comprising:
sending the updated navigation data to the client in an instance in which the view is invalid; and
the executable code being further configured to:
generate an updated hierarchy of views based on the updated navigation data; and
update the user interface and the navigation components based on the updated hierarchy of views.

15. The computer-implemented method of claim 13, wherein the response indicates that the view is invalid, and the executable code being further configured to update the user interface to display a home view of the hierarchy of views in an instance in which the view is invalid, wherein the home view is static.

16. The computer-implemented method of claim 12, wherein the navigation components display the hierarchy of views in different formats from one another.

17. The computer-implemented method of claim 12, wherein the response includes the data associated with the view, and the executable code further is configured to dynamically generate an instance of the view based on the data, and wherein updating the user interface comprises displaying the instance of the view.

18. The computer-implemented method of claim 12, wherein:
the navigation components comprise an active state and a non-active state;
during the active state, the navigation components display an entire hierarchal structure of available navigation entries corresponding to the hierarchy of views; and
during the non-active state, the navigation components display a reference to a last activated view.

19. The computer-implemented method of claim 12, wherein the hierarchy of views correspond to a structure of an enterprise environment for a datacenter.

20. The computer-implemented method of claim 12, wherein generating an updated hierarchy of views further comprises feeding the updated navigation data into a view template.

* * * * *